US012146118B2

(12) United States Patent
Aono et al.

(10) Patent No.: US 12,146,118 B2
(45) **Date of Patent: *Nov. 19, 2024**

(54) METHOD FOR CLEANING HARD ARTICLES

(71) Applicant: KAO CORPORATION, Tokyo (JP)

(72) Inventors: Keita Aono, Wakayama (JP); Satoru Okamura, Wakayama (JP)

(73) Assignee: KAO CORPORATION, Tokyo (JP)

(*) Notice: Subject to any disclaimer, the term of this patent is extended or adjusted under 35 U.S.C. 154(b) by 7 days.

This patent is subject to a terminal disclaimer.

(21) Appl. No.: 17/910,041

(22) PCT Filed: Mar. 16, 2021

(86) PCT No.: PCT/JP2021/010641

§ 371 (c)(1),
(2) Date: Sep. 8, 2022

(87) PCT Pub. No.: WO2021/187489

PCT Pub. Date: Sep. 23, 2021

(65) Prior Publication Data

US 2023/0112902 A1 Apr. 13, 2023

(30) Foreign Application Priority Data

Mar. 17, 2020 (JP) ................................ 2020-046794

(51) Int. Cl.

*C11D 1/28* (2006.01)
*C11D 17/08* (2006.01)
*A47L 15/44* (2006.01)

(52) U.S. Cl.

CPC ................ *C11D 1/28* (2013.01); *C11D 17/08* (2013.01); *A47L 15/44* (2013.01)

(58) Field of Classification Search

CPC ........... C11D 3/43; C11D 1/83; C11D 3/2068; C11D 1/831; C11D 3/0026; C11D 3/0094; C11D 1/29; C11D 1/662; C11D 1/92; C11D 1/123; C11D 1/75; C11D 17/0043; C11D 1/94; C11D 1/02; C11D 1/72; C09K 23/017; C09K 23/10; C09K 23/16; C09K 23/04; C09K 23/56; A61Q 19/10; A61K 8/345; A61K 8/046; A61K 8/463; A61K 8/602; A61K 8/466; A61K 8/39

See application file for complete search history.

(56) References Cited

U.S. PATENT DOCUMENTS

| | | | | |
|---|---|---|---|---|
| 2,028,091 | A | 1/1936 | Jaeger | |
| 4,434,091 | A | 2/1984 | Cox et al. | |
| 5,908,582 | A | 6/1999 | Feustel et al. | |
| 2005/0239674 | A1* | 10/2005 | Dreja | C11D 3/124 510/180 |
| 2007/0214999 | A1* | 9/2007 | Meyer | C07C 309/17 106/14.05 |
| 2018/0201885 | A1 | 7/2018 | Bittner et al. | |

FOREIGN PATENT DOCUMENTS

| | | | |
|---|---|---|---|
| JP | S58-24555 | A | 2/1983 |
| JP | S63-207900 | A | 8/1988 |
| JP | H09-500884 | A | 1/1997 |
| JP | 2012172032 | A * | 9/2012 |
| JP | 2013100462 | A | 5/2013 |
| JP | 2017141478 | A | 8/2017 |
| JP | 2017214554 | A | 12/2017 |
| JP | 2018529989 | A | 10/2018 |
| JP | 2018184516 | A | 11/2018 |
| JP | 2019104852 | A | 6/2019 |
| WO | WO-2013054635 | A1 | 4/2013 |
| WO | WO-2017009068 | A1 | 1/2017 |
| WO | WO-2017204149 | A1 | 11/2017 |

OTHER PUBLICATIONS

English translation of International Preliminary Report on Patentability and Written Opinion issued Sep. 29, 2022 in PCT/JP2021/010641, 6 pages.
International Search Report issued Jun. 15, 2021 in PCT/JP2021/010641 (with English translation), 6 pages.
Extended European Search Report issued Feb. 27, 2024 in corresponding European Patent Application No. 21770795.9, 8 pages.

* cited by examiner

*Primary Examiner* — Vishal V Vasisth
(74) *Attorney, Agent, or Firm* — Element IP, PLC

(57) ABSTRACT

The present invention is a method for cleaning hard articles including, cleaning a hard article to which an oil stain is adhered with a cleaning liquid containing 1 ppm or more and less than 500 ppm of (a) a branched alkyl sulfosuccinate ester having a branched alkyl group with 9 or 10 carbons and water.

11 Claims, No Drawings

METHOD FOR CLEANING HARD ARTICLES

This application is a 371 of PCT/JP2021/010641 filed Mar. 16, 2021.

FIELD OF THE INVENTION

The present invention relates to a method for cleaning hard articles and a cleaning agent composition.

BACKGROUND OF THE INVENTION

Cleaning agent compositions containing surfactants are used in many cleaning agents as they have high cleaning effects on oily stains. Cleaning agent compositions are composed by adjusting composition in various ways in consideration of cleaning effects on dirt, as well as properties required according to target products, forms that the compositions take, usage or the like.

JP-A S63-207900 discloses a liquid cleaning agent composition comprising a dialkyl sulfosuccinate ester.

JP-A H9-500884 discloses using a liquid composition comprising a sulfosuccinic acid diester with a predetermined structure as a wetting agent and an emulsifier.

JP-A 2017-214554 discloses a tableware detergent composition comprising a predetermined alkyl sulfosuccinate ester with a hyperbranched structure.

JP-A 2018-529989 discloses use of a composition comprising an ammonium salt of a specific compound such as a sulfobutanedioic acid diester or the like, for cleaning or rinsing a product comprising a substrate and a patterned material layer supported thereon, the patterned material layer having line-space structures with a line width of 50 nm and below.

JP-A 2013-100462 discloses a technology of a detergent composition for hand-washing of tableware comprising di-2-ethylhexyl sulfosuccinate, wherein the composition exhibits rich foaming during washing and foam persistence during washing, but foam disappears instantaneously during rinsing, so that rinsing is completed with a small amount of water.

SUMMARY OF THE INVENTION

Cleaning agents containing surfactants also have foamability as a property of the surfactants. This foamability may often be a preferable property as in the case of handwashing cleaning agents, but in the case where a dishwasher is used to perform cleaning, foam filling the inside of the chamber may adversely reduce the cleaning effect. Therefore, for example, when an automatic dishwasher is used to clean tableware, it is desirable that cleaning agents be excellent in cleaning power, especially cleaning power against oil stains, as well as being excellent in foam suppression ability without forming excessive foam.

Further, optical articles such as medical articles, eyeglasses or the like may sometimes be cleaned with an ultrasonic cleaner or the like, and such cleaning also requires high cleaning power and foam suppression ability. Further, wiping and cleaning agents for use on hard surfaces or the like are also expected to have suppressed foaming to efficiently remove dirt.

Defoaming agents such as silicone or the like are usually applied to impart such foam suppression ability to cleaning agents, but the development of cleaning methods or cleaning agent compositions having high cleaning effects and exhibiting foam suppression ability is very beneficial to the above technologies as defoaming agents no longer have to be used.

The present invention provides a method for cleaning hard articles and a liquid cleaning agent composition excellent in the ability to clean oil stains and foam suppression ability.

The present invention relates to a method for cleaning hard articles including, cleaning a hard article to which an oil stain is adhered with a cleaning liquid containing 1 ppm or more and less than 500 ppm of (a) a branched alkyl sulfosuccinate ester having a branched alkyl group with 9 or 10 carbons [hereinafter referred to as component (a)] and water.

Further, the present invention relates to a liquid cleaning agent composition containing component (a) and water, wherein the liquid cleaning agent composition contains component (a) at a concentration of 1 ppm or more and less than 500 ppm during use.

According to the present invention, provided are a method for cleaning hard articles and a liquid cleaning agent composition excellent in the ability to clean oil stains and foam suppression ability.

EMBODIMENTS OF THE INVENTION

<Liquid Cleaning Agent Composition>

Component (a) is a branched alkyl sulfosuccinate ester having a branched alkyl group, wherein the branched alkyl group is a branched alkyl group with 9 or 10 carbons.

Examples of component (a) include those in which the ester is a monoester and those in which the ester is a diester. Preferable is a branched alkyl sulfosuccinate diester in which the branched alkyl groups are branched alkyl groups with 9 or 10 carbons.

The branched alkyl group of component (a) is preferably a branched alkyl group having a main chain with 6 or 7 carbons and one or more side chains, the side chains having 3 carbons in total.

The branched alkyl group of component (a) is preferably a branched alkyl group selected from a 2-propylheptyl group and a 3,5,5-trimethylhexyl group.

Component (a) may be a salt. In other words, component (a) may be a compound selected from branched alkyl sulfosuccinate esters having a branched alkyl group with 9 or 10 carbons and salts thereof. Examples of the salts include inorganic salts such as sodium salts, potassium salts, ammonium salts, magnesium salts or the like, and organic salts such as monoethanolamine salts, diethanolamine salts, triethanolamine salts, morpholine salts or the like. The salts for component (a) are preferably inorganic salts selected from alkali metal salts such as sodium salts, potassium salts or the like and alkaline earth metal salts such as magnesium salts or the like, and more preferably alkali metal salts.

Examples of component (a) include a branched sulfosuccinate ester represented by the following general formula (a1):

$$R^{1a}\text{-}(OA^1)_x\text{-}OCOCH_2\underset{\displaystyle SO_3M^1}{\underset{|}{C}}HCOO\text{-}(A^2O)_y\text{-}R^{2a} \qquad (a1)$$

wherein $R^{1a}$ and $R^{2a}$ are each independently a branched alkyl group with 9 or 10 carbons; $A^1$ and $A^2$ are each independently an alkylene group with 2 or more and 4 or less carbons, and x and y are average numbers of added moles and each independently 0 or more and 6 or less; and $M^1$ is a hydrogen atom or a cationic ion.

The numbers of carbons in $R^{1a}$ and $R^{2a}$ may be the same or different.

In the present invention, an open-chain branched hydrocarbon group includes a secondary alcohol from which a hydroxy group is removed to leave a hydrocarbon residue.

In the open-chain branched hydrocarbon group (branched alkyl group) of $R^{1a}$ or $R^{2a}$ in the present invention, the hydrocarbon chain having the largest number of carbons counted from the carbon atom bonded to the oxygen atom is considered a main chain, and a hydrocarbon chain branched from and bonded to the main chain is considered a side chain.

When there are two or more possible main chains, i.e., when there are two or more hydrocarbon chains having the largest number of carbons (hereinafter also referred to as the longest hydrocarbon chains), the main chain is determined in the following order:

1. the longest hydrocarbon chain from which a side chain having a larger number of carbon atoms is branched is considered the main chain;
2. next, when the side chains branched from the longest hydrocarbon chains have the same number of carbon atoms, the longest hydrocarbon chain from which a larger number of side chains are branched is considered the main chain;
3. next, when the same number of side chains are branched from the longest hydrocarbon chains, the longest hydrocarbon chain having a side chain at a carbon atom which is closer to the oxygen atom when counted from the carbon atom bonded to the oxygen atom is considered the main chain; and
4. next, when the carbon atoms having a side chain at the position closest to the oxygen atom are equally close to the oxygen atom, the longest hydrocarbon chain in which the side chain closest to the oxygen atom has a larger number of carbon atoms is considered the main chain.

Note that when there are two or more longest hydrocarbon chains having the same symmetric structure, any of them may be considered the main chain.

The total numbers of carbons constituting side chains in the branched alkyl groups of $R^{1a}$ and $R^{2a}$ may be the same or different, and are each preferably 3 from the viewpoints of the ability to clean solid fats or the like and foam suppression ability.

In the present invention, the total number of carbons constituting side chains is the total number of carbons in all the side chains other than the main chain in one branched alkyl group, and when there is a plurality of side chains, it is the total number of carbons in all those side chains.

The numbers of side chains in $R^{1a}$ and $R^{2a}$ may be the same or different, and are each 1 or more, and preferably 3 or less and more preferably 2 or less from the viewpoints of the ability to clean solid fats or the like and foam suppression ability.

In the present invention, the number of side chains is the number of side chains branched from a main chain, and even if the side chains have side chains further branched from the side chains, the main chain is considered to have the same number of side chains. Note that the side chains may have side chains further branched from the side chains from the viewpoints of the ability to clean solid fats or the like and foam suppression ability.

The numbers of branching carbons in $R^{1a}$ and $R^{2a}$ may be the same or different, and are each 1 or more, and preferably 3 or less and furthermore preferably 2 or less from the viewpoints of the ability to clean solid fats or the like and foam suppression ability.

In the present invention, the number of branching carbons is the total of the numbers of tertiary carbon atoms and quaternary carbon atoms in an open-chain branched hydrocarbon group.

In a preferable aspect for $R^{1a}$ and $R^{2a}$, the open-chain branched hydrocarbon groups of $R^{1a}$ and $R^{2a}$ each independently have 9 or 10 carbons in total, each independently have a main chain with 6 or 7 carbons, each independently have a side chain with 1 or more and 3 or less constituting carbons and each independently have one side chain.

Specific branched alkyl groups of $R^{1a}$ and $R^{2a}$ may be the same or different, and are each preferably a branched alkyl group selected from a 2-propylheptyl group and a 3,5,5-trimethylhexyl group.

In the general formula (a1), $A^1$ and $A^2$ are each independently an alkylene group with 2 or more, and 4 or less and preferably 3 or less carbons.

In the general formula (a1), x and y are average numbers of added moles, and each independently 0 or more, and 6 or less, preferably 4 or less and more preferably 2 or less, and further preferably 0 from the viewpoints of the ability to clean solid fats or the like and foam suppression ability.

Further, x+y is preferably 0 or more, and preferably 12 or less, more preferably 6 or less and further preferably 3 or less, and furthermore preferably 0 from the viewpoints of the ability to clean solid fats or the like and foam suppression ability.

In the general formula (a1), $M^1$ is a hydrogen atom or a cationic ion. Examples of the cationic ion include inorganic cationic ions such as sodium ion, ammonium ion, potassium ion, magnesium ion or the like, and organic cationic ions such as monoethanol ammonium ion, diethanol ammonium ion, triethanol ammonium ion, morpholinium ion or the like. $M^1$ is preferably an inorganic cationic ion selected from alkali metal ions such as sodium ion, potassium ion or the like and alkaline earth metal ions such as magnesium ion or the like, and more preferably an alkali metal ion.

A method for preparing a compound in which $R^{1a}$ and $R^{2a}$ are the same in the general formula (a1) is not particularly limited, but such a compound can be produced, for example, by referring to the method described in U.S. Pat. No. 2,028,091, and an asymmetric compound in which $R^{1a}$ and $R^{2a}$ are different can be produced, for example, by referring to JP-A S58-24555 for a method for preparing the same. An alcohol with a predetermined number of carbons to which an alkylene oxide is added can be used as a raw material for component (a).

Examples of suitable alcohols used to produce component (a) of the present invention include:

(1) primary alcohols represented by 3,5,5-trimethylhexane-1-ol, 2-propylheptan-1-ol or the like; and (2) secondary alcohols represented by 5-nonanol, 2,6-dimethyl-4-heptanol or the like.

In the present invention, the liquid cleaning agent composition excellent in the ability to clean solid fats or the like and foam suppression ability can be provided by using component (a). Here, foam suppression ability in the present invention refers to the degree of suppression of foam formed during cleaning, and a composition can be judged as having excellent foam suppression ability, for example, when forming a small amount of foam during cleaning by applying mechanical force in a washer. Specifically, in the case where cleaning is performed in a washer provided with a washing tank storing a cleaning liquid, the foam suppression ability is judged as being good if a thickness of a layer of foam formed in the cleaning liquid inside the washing tank is less than 1 cm, and further, the foam suppression ability can be judged as being better if a proportion of the layer of foam with a thickness of less than 1 cm to the area of the liquid surface is ½ or less.

Surfactants are usually required to have high interfacial-active performance when applied in technologies that require foam suppression ability, such as cleaning agents for use in an automatic dishwasher or the like, as they need to clean burdensome dirt such as solid fats, liquid fats or the like. On the other hand, such surfactants have high foamability, and fill the inside of the washer chamber with foam during cleaning, thereby imposing a burden on rinsing as well as reducing cleaning power due to foam. Particularly, anionic surfactants and nonionic surfactants exhibit high foamability while having excellent cleaning effects on oil stains, and thus were difficult to apply in technologies that require foam suppression ability, such as cleaning agents for use in an automatic dishwasher or the like. Therefore, surfactants not only having high interfacial-active performance for solid fats, liquid fats or the like but also excellent in foam suppression ability are demanded.

Component (a) of the present invention adsorbs to a gas-liquid interface at a slower rate and also decreases surface tension at a slower rate compared to general surfactants. Therefore, if it is used alone, it makes a gas-liquid interface unstable, making it difficult to form foam. On the other hand, the sulfosuccinate type surfactant of component (a) having one or two branched alkyl groups with a predetermined number of carbons and one hydrophilic group is excellent in adsorptivity to an oil-water interface, although the reason for this is not clear. Therefore, component (a) can effectively reduce oil-water interfacial tension at a low concentration. As a result, component (a) functions as a surfactant that can achieve very high cleaning power while having very low foamability, and a liquid cleaning agent containing this can be low in foamability and have excellent cleaning power against oil stains even if the agent contains component (a) at a low concentration.

The liquid cleaning agent composition of the present invention contains component (a) at a concentration of 1 ppm (mass basis, the same applies hereinafter) or more, preferably 5 ppm or more and more preferably 10 ppm or more, and less than 500 ppm, preferably 400 ppm or less, more preferably 300 ppm or less, further preferably 200 ppm or less, furthermore preferably 150 ppm or less, furthermore preferably 100 ppm or less and furthermore preferably 50 ppm or less during use from the viewpoints of the ability to clean solid fats or the like and foam suppression ability.

Note that, in the present invention, descriptions relating to the amount of component (a) (ppm or mass ratio) are based on the mass of a compound in the form of a sodium salt, for example, the mass when $M^1$ in the general formula (a1) is assumed to be sodium.

The composition of the present invention can contain a surfactant other than component (a) [hereinafter referred to as component (b)], but care needs to be taken if it is used as it might impair foam suppression ability. The content of component (b) falls within a range that it does not impair the effects of component (a). In the present invention, the content of component (b) is preferably 50 mass % or less, more preferably 20 mass % or less, further preferably 10 mass % or less and furthermore preferably 5 mass % or less, and may be 0 mass % relative to the total of the content of component (a) and the content of component (b). Particularly, a surfactant having a hydrocarbon group, for example, an alkyl group, with 12 or more and 14 or less carbons other than component (a) [hereinafter referred to as component (b1)] might impair foam suppression ability, so that the content of component (b1) in the present invention is preferably 20 mass % or less, more preferably 10 mass % or less, further preferably 5 mass % or less and furthermore preferably 1 mass % or less, and may be 0 mass % relative to the total of the content of component (a) and the content of component (b1).

The liquid cleaning agent composition of the present invention may contain optional components other than component (a) in a range that they do not impair the effects of the present invention. The composition can be formulated with components such as solvents, hydrotrope agents, dispersants, pH adjusters, thickeners, viscosity adjusters, fragrances, colorants, antioxidants, preservatives, foam suppressants, bleaching agents, bleach activators or the like (not qualified as component (a)) as optional components.

The liquid cleaning agent composition of the present invention can be produced by mixing a predetermined amount of component (a) with water. At that time, a precursor composition containing component (a) can be diluted with water to obtain the composition of the present invention. For example, the liquid cleaning agent composition of the present invention may be prepared by carrying out such dilution immediately before the composition of the present invention is used. Examples of the precursor composition include, for example, a composition containing component (a) in an amount of preferably 0.01 mass % or more, more preferably 0.05 mass % or more and further preferably 0.1 mass % or more, and 5 mass % or less and more preferably 3 mass % or less and water.

The liquid cleaning agent composition of the present invention has a pH of preferably 2 or more, more preferably 4 or more and further preferably 5 or more, and preferably 10 or less, more preferably 9 or less and further preferably 8 or less at 25° C. from the viewpoint of irritation to hand skin. Note that the pH can be measured by a glass electrode method.

The liquid cleaning agent composition of the present invention, for example, has a viscosity of preferably 3 mPa s or more and more preferably 10 mPa-s or more, and preferably 5,000 mPa s or less and more preferably 2,500 mPa s or less at 25° C. although it depends on uses or the like. The viscosity can be adjusted with commonly-used thickeners, solvents, hydrotrope agents or the like.

In the present invention, a method of diluting the liquid cleaning agent composition with water, for example, 10 times or more and less than 10,000 times and preferably 50 times or more and less than 5,000 times to prepare a liquid cleaning agent composition (cleaning liquid) and using it for cleaning is suitable.

The liquid cleaning agent composition of the present invention is suitable for use on hard articles and more suitable for use on tableware. Further, the liquid cleaning agent composition of the present invention is suitable as a cleaning agent for cleaning tableware in an automatic dishwasher. In other words, the liquid cleaning agent composition of the present invention is preferably a liquid cleaning agent composition for use in an automatic dishwasher. The liquid cleaning agent composition of the present invention may be a liquid cleaning agent composition with low foamability.

<Method for Cleaning Hard Articles>

The present invention relates to a method for cleaning hard articles including, cleaning a hard article to which an oil stain is adhered with a cleaning liquid containing 1 ppm or more and less than 500 ppm of component (a) and water (hereinafter sometimes also referred to as the cleaning liquid of the present invention).

The cleaning liquid of the present invention can be obtained by mixing the liquid cleaning agent composition of the present invention with water. Further, the cleaning liquid of the present invention can be obtained by diluting the precursor composition containing component (a) with water. Further, the liquid cleaning agent composition of the present invention may also be used as-is as the cleaning liquid of the present invention.

The matters stated in the liquid cleaning agent composition of the present invention can be appropriately applied to the method for cleaning hard articles of the present invention. Specific examples, preferable aspects or the like for component (a) are the same as those in the liquid cleaning agent composition of the present invention.

The oil stain may be an oil stain derived from food. The oil stain may be an oil stain including a solid fat. The oil stain may be an oil stain including a solid fat derived from food.

Examples of the hard article include tableware, and further, tableware to which an oil stain including a solid fat is adhered. Further, examples of the hard article include a medical instrument or an optical instrument that surfactant residues should be strictly controlled. In the present invention, an automatic dishwasher is preferably used to clean tableware, and further, tableware to which an oil stain including a solid fat is adhered.

The automatic dishwasher may be any automatic dishwasher commonly available on the market, and for example, either a household automatic dishwasher or a commercial automatic dishwasher may be used.

Cleaning conditions are not particularly limited, and cleaning temperature, cleaning time or the like can be in conformance with publicly-known cleaning conditions for automatic dishwashers.

The cleaning liquid of the present invention contains 1 ppm or more, preferably 5 ppm or more and more preferably 10 ppm or more, and less than 500 ppm, preferably 400 ppm or less, more preferably 300 ppm or less, further preferably 200 ppm or less, furthermore preferably 150 ppm or less, furthermore preferably 100 ppm or less and furthermore preferably 50 ppm or less of component (a) from the viewpoints of the ability to clean solid fats or the like and foam suppression ability.

The cleaning liquid of the present invention has a pH of preferably 2 or more, more preferably 4 or more and further preferably 5 or more, and preferably 10 or less, more preferably 9 or less and further preferably 8 or less from the viewpoint of irritation to hand skin. This pH is a pH at cleaning temperature.

In the cleaning method of the present invention, a cleaning temperature is preferably 40° C. or more and more preferably 50° C. or more from the viewpoint of cleaning ability, and preferably 80° C. or less and more preferably 70° C. or less from the viewpoints of cleaning ability and productivity. The cleaning liquid of the present invention may have a temperature falling within this cleaning temperature range.

The above content of component (a), cleaning time and cleaning temperature are also preferable conditions for cleaning tableware in an automatic dishwasher.

After cleaned in an automatic dishwasher, the tableware is quickly rinsed, usually in the same automatic dishwasher, with water, warm water or hot water, for example, hot water at 70° C. or more and 90° C. or less, for 5 seconds or more and 15 seconds or less.

Aspects of the Present Invention

The following aspects of the present invention are described by way of example. The matters stated in the method for cleaning hard articles and the liquid cleaning agent composition of the present invention can be appropriately applied to these aspects.

<1>

A method for cleaning hard articles including, cleaning a hard article to which an oil stain is adhered with a cleaning liquid containing 1 ppm or more and less than 500 ppm of (a) a branched alkyl sulfosuccinate ester having a branched alkyl group with 9 or 10 carbons [hereinafter referred to as component (a)] and water.

<2>

The method for cleaning hard articles according to <1>, wherein the branched alkyl group of component (a) is a branched alkyl group having a main chain with 6 or 7 carbons and one or more side chains, the side chains having 3 carbons in total.

<3>

The method for cleaning hard articles according to <1> or <2>, wherein the branched alkyl group of component (a) is a branched alkyl group selected from a 2-propylheptyl group and a 3,5,5-trimethylhexyl group.

<4>

The method for cleaning hard articles according to any of <1> to <3>, wherein component (a) is a branched sulfosuccinate ester represented by the following general formula (a1):

$$R^{1a}\text{-}(OA^1)_x\text{-}OCOCH_2\underset{\substack{|\\ SO_3M^1}}{C}HCOO\text{-}(A^2O)_y\text{-}R^{2a} \qquad \text{(a1)}$$

wherein $R^{1a}$ and $R^{2a}$ are each independently a branched alkyl group with 9 or 10 carbons; $A^1$ and $A^2$ are each independently an alkylene group with 2 or more and 4 or less carbons, and x and y are average numbers of added moles and each independently 0 or more and 6 or less; and $M^1$ is a hydrogen atom or a cationic ion.

<5>

The method for cleaning hard articles according to <4>, wherein the numbers of side chains in $R^{1a}$ and $R^{2a}$ in the general formula (a1) are the same or different.

<6>

The method for cleaning hard articles according to <4> or <5>, wherein the numbers of side chains in $R^{1a}$ and $R^{2a}$ in the general formula (a1) are each 1 or more, and preferably 3 or less and more preferably 2 or less.

<7>

The method for cleaning hard articles according to any of <4> to <6>, wherein the numbers of branching carbons in $R^{1a}$ and $R^{2a}$ in the general formula (a1) are the same or different.

<8>

The method for cleaning hard articles according to any of <4> to <7>, wherein the numbers of branching carbons in $R^{1a}$ and $R^{2a}$ in the general formula (a1) are each 1 or more, and preferably 3 or less and furthermore preferably 2 or less.

<9>

The method for cleaning hard articles according to any of <4> to <8>, wherein the branched alkyl groups of $R^{1a}$ and $R^{2a}$ in the general formula (a1) each independently have 9 or 10 carbons in total, each independently have a main chain with 6 or 7 carbons, each independently have a side chain with 1 or more and 3 or less constituting carbons and each independently have one side chain.

<10>

The method for cleaning hard articles according to any of <4> to <9>, wherein $R^{1a}$ and $R^{2a}$ in the general formula (a1) are the same or different, and each a branched alkyl group selected from a 2-propylheptyl group and a 3,5,5-trimethylhexyl group.

<11>

The method for cleaning hard articles according to any of <4> to <10>, wherein x and y in the general formula (a1) are each independently 0.

<12>

The method for cleaning hard articles according to any of <4> to <11>, wherein $M^1$ in the general formula (a1) is an alkali metal ion.

<13>

The method for cleaning hard articles according to any of <1> to <12>, wherein component (a) is a branched alkyl sulfosuccinate diester having branched alkyl groups with 9 or 10 carbons.

<14>

The method for cleaning hard articles according to any of <1> to <13>, wherein component (a) is an alkali metal salt.

<15>

The method for cleaning hard articles according to any of <1> to <14>, wherein the cleaning liquid contains 1 ppm or more, preferably 5 ppm or more and more preferably 10 ppm or more, and less than 500 ppm, preferably 400 ppm or less, more preferably 300 ppm or less, further preferably 200 ppm or less, furthermore preferably 150 ppm or less, furthermore preferably 100 ppm or less and furthermore preferably 50 ppm or less of component (a).

<16>

The method for cleaning hard articles according to any of <1> to <15>, wherein the cleaning liquid optionally contains a surfactant other than component (a) [hereinafter referred to as component (b)], and the content of component (b) is preferably 50 mass % or less, more preferably 20 mass % or less, further preferably 10 mass- or less and furthermore preferably 5 mass % or less, or 0 mass % relative to the total of the content of component (a) and the content of component (b).

<17>

The method for cleaning hard articles according to any of <1> to <16>, wherein the cleaning liquid optionally contains a surfactant having a hydrocarbon group, for example, an alkyl group, with 12 or more and 14 or less carbons other than component (a) [hereinafter referred to as component (b1)], and the content of component (b1) is preferably 20 mass % or less, more preferably 10 mass, or less, further preferably 5 mass % or less and furthermore preferably 1 mass % or less, or 0 mass % relative to the total of the content of component (a) and the content of component (b1).

<18>

The method for cleaning hard articles according to any of <1> to <17>, wherein the hard article is tableware.

<19>

The method for cleaning hard articles according to any of <1> to <18>, wherein the hard article is tableware to which an oil stain including a solid fat is adhered.

<20>

The method for cleaning hard articles according to <18> or <19>, wherein an automatic dishwasher is used to clean the tableware.

<21>

A liquid cleaning agent composition containing (a) a branched alkyl sulfosuccinate ester having a branched alkyl group with 9 or 10 carbons [hereinafter referred to as component (a)] and water, wherein the liquid cleaning agent composition contains component (a) at a concentration of 1 ppm or more and less than 500 ppm during use.

<22>

The liquid cleaning agent composition according to <21>, wherein the branched alkyl group of component (a) is a branched alkyl group having a main chain with 6 or 7 carbons and one or more side chains, the side chains having 3 carbons in total.

<23>

The liquid cleaning agent composition according to <21> or <22>, wherein the branched alkyl group of component (a) is a branched alkyl group selected from a 2-propylheptyl group and a 3,5,5-trimethylhexyl group.

<24>

The liquid cleaning agent composition according to any of <21> to <23>, wherein component (a) is a branched sulfosuccinate ester represented by the following general formula (a1):

$$R^{1a}\text{—}(OA^1)_x\text{—}OCOCH_2\underset{\displaystyle SO_3M^1}{\underset{|}{C}}HCOO\text{—}(A^2O)_y\text{—}R^{2a} \qquad (a1)$$

wherein $R^1$ and $R^{2a}$ are each independently a branched alkyl group with 9 or 10 carbons; $A^1$ and $A^2$ are each independently an alkylene group with 2 or more and 4 or less carbons, and x and y are average numbers of added moles and each independently 0 or more and 6 or less; and $M^1$ is a hydrogen atom or a cationic ion.

<25>

The liquid cleaning agent composition according to <24>, wherein the numbers of side chains in $R^{1a}$ and $R^{2a}$ in the general formula (a1) are the same or different.

<26>

The liquid cleaning agent composition according to <24> or <25>, wherein the numbers of side chains in $R^{1a}$ and $R^{2a}$ in the general formula (a1) are each 1 or more, and preferably 3 or less and more preferably 2 or less.

<27>

The liquid cleaning agent composition according to any of <24> to <26>, wherein the numbers of branching carbons in $R^{1a}$ and $R^{2a}$ in the general formula (a1) are the same or different.

<28>

The liquid cleaning agent composition according to any of <24> to <27>, wherein the numbers of branching carbons in $R^{1a}$ and $R^{2a}$ in the general formula (a1) are each 1 or more, and preferably 3 or less and furthermore preferably 2 or less.

<29>

The liquid cleaning agent composition according to any of <24> to <28>, wherein the branched alkyl groups of $R^{1a}$ and $R^{2a}$ in the general formula (a1) each independently have 9 or 10 carbons in total, each independently have a main chain with 6 or 7 carbons, each independently have a side chain with 1 or more and 3 or less constituting carbons and each independently have one side chain.

<30>

The liquid cleaning agent composition according to any of <24> to <29>, wherein $R^{1a}$ and $R^{2a}$ in the general formula (a1) are the same or different, and each a branched alkyl group selected from a 2-propylheptyl group and a 3,5,5-trimethylhexyl group.

<31>

The liquid cleaning agent composition according to any of <24> to <30>, wherein x and y in the general formula (a1) are each independently 0.

<32>

The liquid cleaning agent composition according to any of <24> to <31>, wherein $M^1$ in the general formula (a1) is an alkali metal ion.

<33>

The liquid cleaning agent composition according to any of <21> to <32>, wherein component (a) is a branched alkyl sulfosuccinate diester having branched alkyl groups with 9 or 10 carbons.

<34>

The liquid cleaning agent composition according to any of <21> to <33>, wherein component (a) is an alkali metal salt.

<35>

The liquid cleaning agent composition according to any of <21> to <34>, wherein the composition comprises component (a) at a concentration of 1 ppm or more, preferably 5 ppm or more and more preferably 10 ppm or more, and less than 500 ppm, preferably 400 ppm or less, more preferably 300 ppm or less, further preferably 200 ppm or less, furthermore preferably 150 ppm or less, furthermore preferably 100 ppm or less and furthermore preferably 50 ppm or less during use.

<36>

The liquid cleaning agent composition according to any of <21> to <35>, wherein the composition optionally contains a surfactant other than component (a) [hereinafter referred to as component (b)], and the content of component (b) is preferably 50 mass % or less, more preferably 20 mass % or less, further preferably 10 mass % or less and furthermore preferably 5 mass % or less, or 0 mass % relative to the total of the content of component (a) and the content of component (b).

<37>

The liquid cleaning agent composition according to any of <21> to <36>, wherein the composition optionally contains a surfactant having a hydrocarbon group, for example, an alkyl group, with 12 or more and 14 or less carbons other than component (a) [hereinafter referred to as component (b1)], and the content of component (b1) is preferably 20 mass or less, more preferably 10 mass % or less, further preferably 5 mass % or less and furthermore preferably 1 mass % or less, or 0 mass % relative to the total of the content of component (a) and the content of component (b1).

<38>

The liquid cleaning agent composition according to any of <21> to <37>, wherein the composition is for use in an automatic dishwasher.

EXAMPLES

(1) Examples 1-1 and 1-2 and Comparative Examples 1-1 to 1-4

The cleaning ability and foam suppression ability of each of the subject liquid cleaning agent compositions in Table 1 during use in an automatic dishwasher (S45VS6SD, manufactured by Panasonic Corporation) were evaluated by the respective methods described below. The results are shown in Table 1.

(1-1) Cleaning Ability

The automatic dishwasher, in which four polypropylene flat plates to which a total of 6 g of beef tallow was applied were placed and 3 g of the liquid cleaning agent composition was put, was run on a normal cycle to perform cleaning. A total of three panelists touched the plates after cleaning and gave scores on the basis of the criteria below, and the average values thereof are listed in the table. In the same manner, 6 g or 12 g of the liquid cleaning agent composition was put, and cleaning was performed on the normal cycle, and evaluations were made in the same manner.

Note that concentrations of component (a) or (b) in cleaning liquids (cleaning liquids formed of a liquid cleaning agent composition diluted with water) applied to the flat plates were 5 ppm, 10 ppm and 20 ppm when putting amounts of the composition were 3 g, 6 g and 12 g, respectively.

* Evaluation criteria for cleaning ability

1: the flat plates feel slippery

2: the flat plates do not feel slippery

3: the flat plates do not feel slippery and further feel moderately squeaky

The larger the numeral is, the higher the cleaning ability is.

(1-2) Foam Suppression Ability

The automatic dishwasher, in which 3 g, 6 g or 12 g of the liquid cleaning agent composition was put, was run on the normal cycle to perform cleaning. The amount of foam on the water surface in the automatic dishwasher was checked during a washing process of the automatic dishwasher and evaluated on the basis of the following criteria.

* Evaluation Criteria for Foam Suppression Ability

Poor: the entire water surface is covered with foam and a thickness of the foam from the water surface is 1 cm or more Average: the entire water surface is covered with foam and a thickness of the foam from the water surface is less than 1 cm Good: the entire water surface is not covered with foam, and in a portion where foam is present, a thickness of the foam from the water surface is less than 1 cm

(2) Examples 1-3 and 1-4

The cleaning ability and foam suppression ability were evaluated in the same manner as in example 1-1 or the like except that 6 g or 18 g of the liquid cleaning agent composition of example 1-3 or 1-4 in Table 1 was put to perform cleaning. Concentrations of component (a) in the cleaning liquids of these examples were 100 ppm and 300 ppm when putting amounts of the composition were 6 g and 18 g, respectively.

(3) Examples 2-1 to 2-4

The cleaning ability and foam suppression ability were evaluated in the same manner as in example 1-1 or the like except that the liquid cleaning agent compositions of examples 2-1 to 2-4 in Table 2 were put in an amount of 6.67 g or 7.5 g to perform cleaning. A concentration of component (a) in the cleaning liquids of these examples was 100 ppm, and putting amounts of the compositions of examples 2-1 and 2-3 and examples 2-2 and 2-4 were 6.67 g and 7.5 g, respectively.

TABLE 1

| | | | | Example | | | | Comparative example | | | |
|---|---|---|---|---|---|---|---|---|---|---|---|
| | | | | 1-1 | 1-2 | 1-3 | 1-4 | 1-1 | 1-2 | 1-3 | 1-4 |
| Liquid cleaning agent composition | Formulation amount (mass %) | (a) | Sodium bis-(2-propylheptyl) sulfosuccinate | 0.5 | | 5 | | | | | |
| | | | Sodium bis-(3,5,5-trimethylhexyl) sulfosuccinate | | 0.5 | | 5 | | | | |
| | | (b) | Sodium bis-(2-ethylhexyl) sulfosuccinate | | | | | 0.5 | | | |
| | | | Alkylbenzene sulfonate | | | | | | 0.5 | | |
| | | | Polyoxyethylene lauryl ether | | | | | | | 0.5 | |
| | | | Polyoxyethylene secondary alkyl ether | | | | | | | | 0.5 |
| | | | Thickener | 1 | 1 | 1 | 1 | 1 | 1 | 1 | 1 |
| | | | Citric acid | 10 | 10 | 10 | 10 | 10 | 10 | 10 | 10 |
| | | | Polypropylene glycol | 2 | 2 | 2 | 2 | 2 | 2 | 2 | 2 |
| | | | Water | Balance | Balance | Balance | Balance | Balance | Balance | Balance | Balance |
| | | | Total | 100 | 100 | 100 | 100 | 100 | 100 | 100 | 100 |
| | | | pH (25° C.)* | 7.8 | 7.8 | 7.8 | 7.8 | 7.8 | 7.8 | 7.8 | 7.8 |
| Cleaning ability | Concentration of component (a) or (b) in cleaning liquid | | 300 ppm | — | — | 3 | 3 | — | — | — | — |
| | | | 100 ppm | — | — | 3 | 3 | — | — | — | — |
| | | | 20 ppm | 3 | 3 | — | — | 2 | 2 | 2 | 2 |
| | | | 10 ppm | 3 | 3 | — | — | 1 | 1 | 2 | 2 |
| | | | 5 ppm | 2.5 | 2.5 | — | — | 1 | 1 | 1 | 1 |
| Foam suppression ability | Concentration of component (a) or (b) in cleaning liquid | | 300 ppm | — | — | Average | Average | — | — | — | — |
| | | | 100 ppm | — | — | Good | Good | — | — | — | — |
| | | | 20 ppm | Good | Good | — | — | Poor | Poor | Poor | Poor |
| | | | 10 ppm | Good | Good | — | — | Average | Poor | Poor | Poor |
| | | | 5 ppm | Good | Good | — | — | Average | Poor | Poor | Poor |

*pH was adjusted with an aqueous sodium hydroxide solution or an aqueous hydrochloric acid solution.

TABLE 2

| | | | | | Example | | | |
|---|---|---|---|---|---|---|---|---|
| | | | | | 2-1 | 2-2 | 2-3 | 2-4 |
| Liquid cleaning agent composition | Formulation amount (mass %) | (a) | Sodium bis-(2-propylheptyl) sulfosuccinate | | 4.5 | 4 | 4.5 | 4 |
| | | (b) | Alkylbenzene sulfonate | | 0.5 | 1.0 | | |
| | | | Polyoxyethylene lauryl ether | | | | 0.5 | 1.0 |
| | | | Thickener | | 1 | 1 | 1 | 1 |
| | | | Citric acid | | 10 | 10 | 10 | 10 |
| | | | Polypropylene glycol | | 2 | 2 | 2 | 2 |
| | | | Water | | Balance | Balance | Balance | Balance |
| | | | Total | | 100 | 100 | 100 | 100 |
| | | | pH (25° C.)* | | 7.8 | 7.8 | 7.8 | 7.8 |
| Cleaning ability | | | Concentration of component (a) in cleaning liquid | 100 ppm | 3 | 3 | 3 | 3 |
| Foam suppression ability | | | Concentration of component (a) in cleaning liquid | 100 ppm | Good | Average | Good | Average |

*pH was adjusted with an aqueous sodium hydroxide solution or an aqueous hydrochloric acid solution.

Some of the components in the tables are listed below.

Alkylbenzene sulfonate: NEOPELEX G-25, Kao Corporation

Polyoxyethylene lauryl ether: EMULGEN 106, Kao Corporation

Polyoxyethylene secondary alkyl ether: SOFTANOL 50, NIPPON SHOKUBAI CO., LTD.

Thickener: cross-linked sodium polyacrylate, AQUPEC HV-501E, manufactured by Sumitomo Seika Chemicals Company, Limited.

Polypropylene glycol: weight average molecular weight 3000 g/mol

The invention claimed is:

1. A method for cleaning hard articles, the method comprising:

cleaning a hard article to which an oil stain is adhered in an automatic dishwasher with a cleaning liquid comprising 1 ppm or more and less than 500 ppm of component (a), which is a branched alkyl sulfosuccinate ester having a branched alkyl group having a main chain with 6 or 7 carbons and one or more side chains, the side chains having 3 carbons in total, and water.

2. The method for cleaning hard articles according to claim 1, wherein the branched alkyl group of the component (a) is a branched alkyl group selected from the group consisting of a 2-propylheptyl group and a 3,5,5-trimethylhexyl group.

3. The method for cleaning hard articles according to claim 1, wherein the cleaning liquid comprises 1 ppm or more and 200 ppm or less of the component (a).

4. The method for cleaning hard articles according to claim 1, wherein the hard article is tableware.

5. The method for cleaning hard articles according to claim 4, wherein the hard article is tableware to which an oil stain comprising a solid fat is adhered.

6. A liquid cleaning agent composition, comprising:
component (a), which is a branched alkyl sulfosuccinate ester having a branched alkyl group having a main chain with 6 or 7 carbons and one or more side chains, the side chains having 3 carbons in total, at a concentration of 1 ppm or more and less than 500 ppm; and water,
wherein the liquid cleaning agent composition is for use to clean oil stains adhered to a hard article in an automatic dishwasher.

7. The liquid cleaning agent composition according to claim 6, wherein the branched alkyl group of the component (a) is a branched alkyl group selected from the group consisting of a 2-propylheptyl group and a 3,5,5-trimethylhexyl group.

8. The method for cleaning hard articles according to claim 1, wherein the component (a) is a branched sulfosuccinate ester represented by formula (a1):

$$R^{1a}\text{-}(OA^1)_x\text{-}OCOCH_2\underset{\substack{|\\ SO_3M^1}}{CH}COO\text{-}(A^2O)_y\text{-}R^{2a} \quad (a1)$$

wherein $R^{1a}$ and $R^{2a}$ are each independently a branched alkyl group with 9 or 10 carbons; $A^1$ and $A^2$ are each independently an alkylene group with 2 or more and 4 or less carbons, and x and y are average numbers of added moles and each independently 0 or more and 6 or less; and $M^1$ is a hydrogen atom or a cationic ion.

9. The method for cleaning hard articles according to claim 1, wherein the cleaning liquid further comprises component (b), which is a surfactant other than the component (a), and a content of the component (b) is 50 mass % or less relative to a total content of the component (a) and the component (b).

10. The method for cleaning hard articles according to claim 1, wherein the cleaning liquid further comprises component (b1), which a surfactant having a hydrocarbon group with 12 or more and 14 or less carbons other than the component (a), and a content of the component (b1) is 20 mass % or less relative to a total content of the component (a) and the component (b1).

11. The liquid cleaning agent composition according to claim 6, wherein the component (a) is a branched sulfosuccinate ester represented by formula (a1):

$$R^{1a}\text{-}(OA^1)_x\text{-}OCOCH_2\underset{\substack{|\\ SO_3M^1}}{CH}COO\text{-}(A^2O)_y\text{-}R^{2a} \quad (a1)$$

wherein $R^{1a}$ and $R^{2'}$ are each independently a branched alkyl group with 9 or 10 carbons; $A^1$ and $A^2$ are each independently an alkylene group with 2 or more and 4 or less carbons, and x and y are average numbers of added moles and each independently 0 or more and 6 or less; and $M^1$ is a hydrogen atom or a cationic ion.

* * * * *